Oct. 4, 1927.

J. C. LEDBETTER 1,644,300

CABLE CONNECTER

Filed May 22, 1924

INVENTOR

James C. Ledbetter

BY
ATTORNEYS

Patented Oct. 4, 1927.

1,644,300

UNITED STATES PATENT OFFICE.

JAMES C. LEDBETTER, OF BROOKLYN, NEW YORK, ASSIGNOR TO THE THOMAS & BETTS CO., OF ELIZABETH, NEW JERSEY, A CORPORATION OF NEW JERSEY.

CABLE CONNECTER.

Application filed May 22, 1924. Serial No. 715,004.

This invention relates to combination cable connecters and outlet boxes, and especially to a new form of connecter for joining cable or conduit to boxes.

A primary object of the invention is to produce an improved cable connecter of increased utility and capable of being used in installing electric cable in old house work as well as new house work which is to say that a main object is to produce a universally adaptable cable connecter capable of interchangeability whereby the same connecter is quickly installed in a box with the cable clamping means disposed within the box as for old house work, or outside the box as for new house work. Furthermore this improved connecter possesses double clamping means in that the electrician doing the work may employ both inside and outside clamping means if desired, though one clamp screw is usually sufficient to anchor the cable to the box.

Heretofore it has been necessary to make a type of cable connecter for new house wiring work and still another for old house work but my connecter may be used for both purposes. It is to be appreciated that, in new house work, the mechanic has access to the outlet and cable box fixtures before they are encased in the wall of the building as by plaster or otherwise and he may conveniently manipulate the fastening means outside the box in anchoring the cable to the box.

However, when it comes to old house work it is necessary to work inside the box because it is undesirable to disturb the wall or plaster around the box for then it becomes necessary to replace it with resulting expense; and so it has been the practice to manufacture and stock a special cable connecter for this inside box work essential in rewiring or installing conduit in old houses where the wall is intact. The special old house cable connecter has its anchor means, usually a camp screw, disposed inside the box, while a new house cable connecter has its anchoring means outside the box. Now with my new form of connecter both inside and outside clamping means is carried on one connecter, and either or both may be used.

An additional object of the invention is to produce a new type cable connecter possessing a simple structure and which is capable of being manufactured at low cost.

The accompanying drawings illustrate a preferred form of the invention the construction of which may be suitably varied or modified in certain respects without departing from the scope of the invention.

Figure 1:
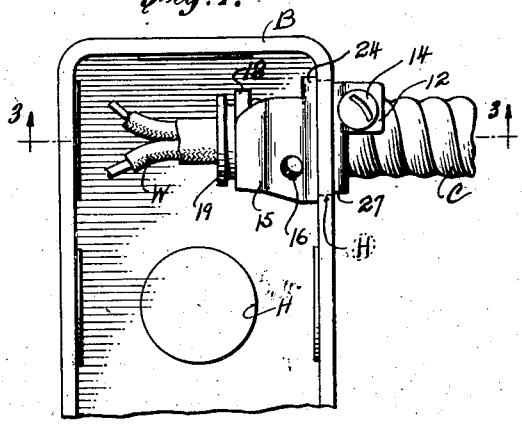
Figure 1 shows a plan view of an electrical fixture box with a cable joined thereto by use of my improved cable connecter.
Figure 2:
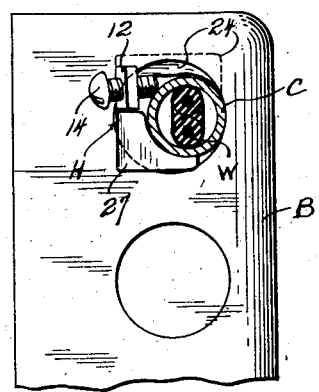
Figure 2 shows an outside projection of Figure 1.
Figure 3:
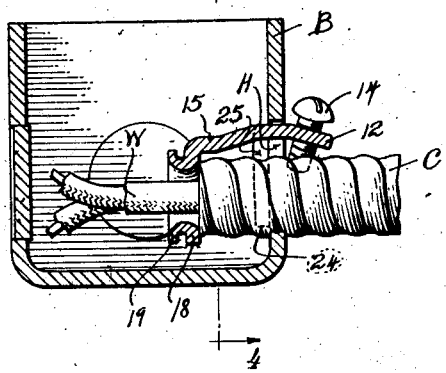
Figure 3 shows a sectional view as developed on the line 3—3 of Figure 1.
Figure 4:
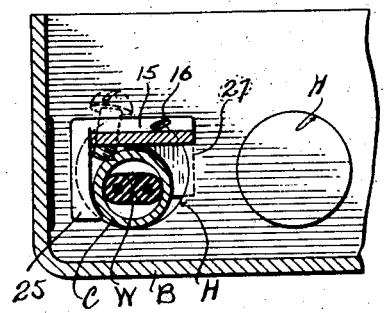
Figure 4 illustrates a cross sectional view developed on the line 4—4 of Figure 3.
Figure 5:
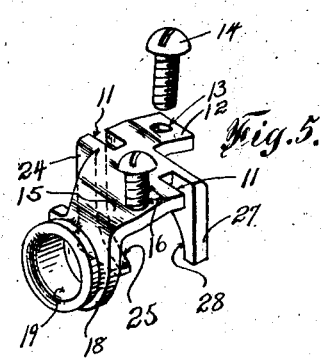
Figure 5 illustrates a perspective view of the cable connecter itself with its clamp screw shown in position ready to be inserted in the outer end thereof.
Figure 6:
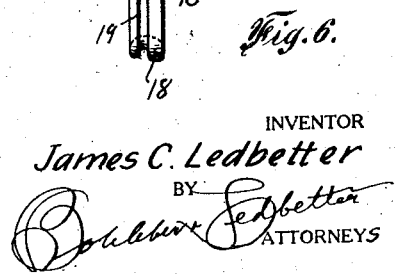
Figure 6 illustrates the improved cable connecter in its simplest form and shows the position of both clamp screws which are interchangeable or both screws may be used. The full line screw indicates position thereof when the cable connecter is adapted for old house work, while the dotted line screw illustrates the position thereof when the connecter is adapted for new house work.

Referring further to the drawings, and with reference to Figures 5 and 6 for a description of the principles of my invention, there is shown a cable connecter comprising a one-piece stamping fashioned from straight bar stock and having an upper flat seat 10 which is punched out on both edges thereof to provide box hole edge anchorage or abutment notches 11. The two notches 11 are aligned with each other and sufficient stock is left between the two notches as to not weaken the bar. The said anchorage notches 11 are preferably located near one end of the bar which leaves the outer end 12 of the bar turned down at an angle; and the outer end 12 is provided with an outside new house work screw hole 13 adapted to receive a clamp screw 14. An inner angular bar portion 15 is provided with a screw hole 16 adapted to receive an old house work cable clamp screw 17. The inner end 15 of the bar carries a cable stop 18 having a rolled or drawn wire guide bushing 19 integrally formed on the outer face thereof.

The above description covers in general the construction and design in the simplest form of the invention as particularly shown in Figure 6 and it is understood how the part may be struck from straight bar stock and the bushing hole 19 punched and drawn for the purpose of protecting the wires W of the cable C as they are passed and drawn through the bushing while the stop plate 18 affords a rest against which the inner end of the cable C abuts to properly position it in a knock-out hole or opening H of the box B.

In old house work, there is usually very little room around the exterior of the cable box and therefore the mechanic is restricted to the inside of the box for not only making wire connections, but for anchoring the cable connecter in the box as well. Therefore in using my improved universal type of cable connecter for old house work, the screw 17 is inserted in the inside tapped screw hole 16 and turned down against the cable. On the other hand, there is always clearance around the exterior of an electrical fixture box in new house work due to the fact that the electricians have access to the installaton work before the plaster is put in or the walls of a building completed, and for that reason he is not confined to work on the inside of the box. He therefore preferably uses the outer clamp screw 14 disposed in the outside screw hole 13 for simultaneously anchoring the cable connecter and cable to the box B.

The assembly views of the drawing not only demonstrate the principle of the simplest form of the cable connecter, but illustrate as well a form of the connecter improved over that shown in Figure 6 and which improvements provide a means of covering over the exposed portion of the box hole H not filled by the cable C.

A cover ear 24 is turned down on one side of the connecter bar by punching the ear from the body of the bar. This ear 24 is struck from the inside box portion of the bar and is made with an arcuate inner edge 25 which conforms to the cylindrical shape of the cable C. The ear is preferably turned down in a plane coincident with the plane defining the inner edge of the anchorage notches 11 and therefore one face of the cover ear 24 rests snugly in contact with the inner face of the box wall B.

An outside cover ear 27 is punched from the material forming the connecter and turned down in a plane parallel and coincident with the plane of the notch 11 and this cover ear 27 similarly possesses an inner edge 28 conforming in contour to the cylindrical shape of the cable C. This arrangement provides companion confronting arcuate edges 25 and 28 which closely fit the exterior cable wall C and afford to a large measure a closing means for covering over the ordinary knock-out hole H in the box. After the cable C is inserted in the box together with the connector, it will be found that the inner and outer cover ears 25 and 27, together with the cable, practically close off the hole H as well as establishing a rigid anchorage with the box and the cable; and my improvements constitute an advance in the art in respect to performing all the aforesaid purposes from one and a single stamped piece. Furthermore, the two turned down ears 24 and 27 are offset just enough to form a continuation of the anchorage notches 11 and the considerable surface area afforded by the adjacent faces of the two ears produces a considerable bearing surface which stands against the inner and outer surface of the box wall B thereby further securing the cable connecter in the box and causing the bushing and stop plate 18—19 to stand in outwardly spaced rigid position from the box wall.

The outer cable clamp screw 14 bears against the cable wall C at a slight angle to the cable axis thereby imposing pressure directly towards that part of the box hole H which bites into and engages the cable C. In a similar manner the inner screw 17 is directed at an angle and imposes pressure on the cable in an angular relation for the purpose of forcibly pinching the cable C into the edge of the cable opening H in the box. If it is found desirable, two screws can always be used in my improved connecter, but for ordinary purposes one cable screw is sufficient and the inner or outer position of the screw depends upon the convenience of the electrician as to whether he is working in new or old installations. Furthermore the screw holes may be set to direct the screw tangentially against the side of the cable to gain a substantial hold on the cable and to avoid crushing the walls thereof.

While it has been largely the practice in the past to produce sleeve-like connecters which entirely surround the cable, and then provide means for securing the cable in the sleeve, the present invention purposely avoids the sleeve-type connecter for the reason that it is found, if the cable C is exposed to the sharp knock-out hole edge in the box, that this very greatly assists in anchoring the cable to the box. In other words, my connecter permits the natural tendency of the cable C to adhere to the sharp box edge when pinched thereagainst, whereas in sleeve-type connecters, the cable is not permitted to grasp the sharp box edge and therefore does not take advantage of the holding means afforded by direct contact between the box and cable.

While I preferably use a flat plate stamping to produce the connecter, other forms of the device is resorted to; and while I have shown notches as box hole edge anchorage means, other forms of anchorage means can be employed. In any event, the connecter is provided with cable clamp means inside or outside the box or for both of these positions.

The connecter is inexpensive to manufacture and fulfills the double purpose of old and new house work alike.

What I claim is:

1. A combination cable box and connecter comprising a box with a cable receiving hole, a cable receiving member made with notches registering with the edge of the box hole, said connecter projecting from each side of the box wall, and each projecting end being made with a tapped screw hole by which a cable clamp screw is inserted in one end or the other as within or without the said box to bind against the cable and force the aforesaid notches into firm engagement with the box hole.

2. A combination cable box and connecter for use in old or new house work, comprising a box having a cable receiving opening, a cable connecter extending through the opening and made with two aligned box opening notches which embrace the edge of the opening, said connecter projecting from either wall of the box, a bent down portion made on each projection and provided with a tapped screw hole in each bent down portion, a cable clamp screw adapted to be carried in either screw hole and disposed at an angle to impose pressure on the cable in a direction leading toward the cable opening where the cable rests, and said screw being disposed in the outer screw hole for new house work and in the inner screw hole for old house work.

3. A combination cable box and connecter comprising a box with a cable receiving hole, a straight piece of stock made with notches near one end thereof registering with the wall of the box hole, said connecter projecting from each side of the box wall, each projecting end being made with a tapped screw hole by which a cable clamp screw is inserted in one end or the other as within or without the said box to bind against the cable and force the aforesaid notches into firm engagement with the box hole, and a turn down plate portion punched from the piece of stock and having confronting curved edges lapping part way around the cable and over-lapping the rim of the aforesaid cable receiving hole to close the cable opening in the box.

4. A cable connecter comprising a cable receiving means having notches therein formed, tapped screw holes made in the member, one to either side of the notches, and a cable clamp screw used in one hole for new house work and the other hole for old house work.

5. A cable connecter comprising a cable receiving member having aligned notches therein formed, tapped screw holes made in the member, one to either side of the notches, and a screw disposed in each screw hole for impinging a cable wall in two separated points thereon.

6. A cable connecter comprising a piece of flat bar stock with a pair of aligned notches punched in the edges thereof, tapped screw holes made in the bar, one to either side of the notches, a screw disposed in each screw hole for impinging a cable wall in two separated points thereon, and a wire bushing formed by bending at right angles and perforating the end of the bar.

7. A cable connecter comprising a piece of flat bar stock with a pair of aligned notches punched in the edges thereof, tapped screw holes made in the bar, one to either side of the notches, said bar being formed angular in relation to that portion of the bar carrying the notches, and each of the said angular portions being made to contain one of the aforesaid screw holes.

8. A cable connecter comprising a member with aligned notches formed therein on opposite sides of the member, tapped screw holes made in the member, one to either side of the notches, said member being formed angular in relation to that portion of the member carrying the notches, each of the said angular portions being made to contain one of the aforesaid screw holes, and a pair of turn down ears made on the member adjacent the notches each of which is made with arcuate confronting edges which are adapted to fit around a cable and close a box hole.

9. A cable connecter comprising a member with a pair of aligned notches formed therein, tapped screw holes made in the member, one to either side of the notches, said member being formed angular in relation to that portion of the bar carrying the notches, each of the said angular portions being made to contain one of the aforesaid screw holes, and a pair of turned down ears formed on the member adjacent the notches to provide a cover means for a cable opening in a box.

10. A cable connecter comprising a cable holding member, anchorage means made thereon for embracing a box wall cable opening, inner and outer portions of the member adapted to project to either side of the anchorage means and stand in rigid relation to said box anchorage means, and a cable clamp screw for use in either projecting portion for engagement with a cable.

11. A cable connecter comprising a device including means for bushing the end of a cable, means carried by the device for engaging the box wall cable opening to anchor the device against movement, said device being provided with tapped holes located to either side of the aforesaid means, and a cable clamp screw for use in one hole in old house work and used in the other hole for new house work.

12. Cable and box connecting means comprising, a box having a connecter and cable receiving hole, a member suitable in size to fit into the box hole and formed to expose a portion of said hole edge to the cable, anchorage means included on the member abutting the box hole edge to anchor it against longitudinal displacement, said member having two screw holes, one to either side of the anchorage means, and a screw for use in either hole to grip against the cable and render effective the anchorage means.

13. A connecter comprising, a member to fit into a box and including anchorage means to engage the box hole edge, said member being provided with a screw hole on one side of the anchorage means and a screw hole on the other side thereof, and a screw mounted in one of the holes.

In testimony whereof I affix my signature.

JAMES C. LEDBETTER.